(12) United States Patent
Stabrawa et al.

(10) Patent No.: US 8,998,526 B2
(45) Date of Patent: Apr. 7, 2015

(54) STRUCTURAL PROFILE SYSTEM (71) Applicant: AIFO Group Zajac Ziecik Stabrawa Spolka jawna, Bochnia (PL)

(72) Inventors: Leszek Stabrawa, Bochnia (PL); Piotr Ziecik, Bochnia (PL); Mateusz Zajac, Lapczyca (PL)

(73) Assignee: AIFO Group Zajac Ziecik Stabrawa Spolka jawna, Bochnia (PL)

( * ) Notice: Subject to any disclaimer, the term of this patent is extended or adjusted under 35 U.S.C. 154(b) by 0 days.

(21) Appl. No.: 14/170,608

(22) Filed: Feb. 1, 2014

(65) Prior Publication Data
US 2014/0220288 A1 Aug. 7, 2014

(30) Foreign Application Priority Data

Feb. 4, 2013 (PL) .......................................... 402660

(51) Int. Cl.
*F16B 7/04* (2006.01)
*B32B 7/08* (2006.01)
(Continued)

(52) U.S. Cl.
CPC ................. *B32B 7/08* (2013.01); *A47B 96/145* (2013.01); *E04C 3/04* (2013.01); *E04C 2003/0417* (2013.01); *E04C 2003/0434* (2013.01); *E04C 2003/0439* (2013.01); *E04C 2003/0447* (2013.01); *E04C 2003/046* (2013.01);
(Continued)

(58) Field of Classification Search
CPC ............... E06B 1/04; E06B 1/36; E06B 1/32; E06B 3/982; E06B 3/9648; E04B 2002/7464; E04B 2/66; E04B 2/62

USPC ........ 52/656.1, 656.7, 656.2, 656.9; 403/170, 403/169, 173, 409.1, 231, 401, 402, 403, 403/205, 295; 312/265.4, 223.1, 257.1, 312/265.1; 40/782, 783
See application file for complete search history.

(56) References Cited

U.S. PATENT DOCUMENTS 5,011,323 A * 4/1991 Liuo .............................. 403/172
5,066,161 A * 11/1991 Pinney .......................... 403/172
(Continued)

FOREIGN PATENT DOCUMENTS

CA 2561334 A1 10/2005
WO 99/55996 A1 11/1999

*Primary Examiner* — Chi Q Nguyen
(74) *Attorney, Agent, or Firm* — Andrew Malarz (57) ABSTRACT

A set of profiles for forming complex profiles comprises two profiles, namely a first profile (10) and a second profile (20), adjoining each other and having walls surrounding a main chamber. Each profile (10, 20) of the set has an outer shape which may be inscribed into a triangle, and has an inner wall (12, 22) with a faying face (13, 23) without protruding fragments. The faying faces (13, 23) adjoining each other, after being coated with adhesive enable a joint to be created when the complex profile is discussed, however, in the case of the set of the profiles they are considered to be contact surfaces. After adjoining the first profile (10) and the second profile (20) by attaching the first faying face (13) to the second faying face (23) in order to create a complex profile (30), a first outer surface (15) of first side walls (14) and a second outer surface (25) of second side walls (24) are situated outside of the complex profile and an angle between the first outer surface (15) and the second outer surface (25) equals to a sum of a first angle (α) between the first faying face (13) and the first outer surface (15) of the first side wall (14) of the first profile (10) and a second angle (β) between the second faying face (23) and the second outer surface (25) of the second side wall (24) of the second profile (20).

12 Claims, 9 Drawing Sheets

(51) Int. Cl.
*A47B 96/14* (2006.01)
*E04C 3/04* (2006.01)

(52) U.S. Cl.
CPC . *E04C2003/0465* (2013.01); *E04C 2003/0469* (2013.01)

(56) References Cited

U.S. PATENT DOCUMENTS

| | | | | |
|---|---|---|---|---|
| 5,516,225 | A * | 5/1996 | Kvols | 403/170 |
| 5,605,410 | A * | 2/1997 | Pantev | 403/297 |
| 6,332,657 | B1 * | 12/2001 | Fischer | 312/111 |
| 6,634,512 | B2 * | 10/2003 | Knab et al. | 211/189 |
| 6,915,616 | B2 * | 7/2005 | Fontana et al. | 52/844 |
| 7,896,177 | B1 * | 3/2011 | Toma | 211/182 |
| 8,028,489 | B1 * | 10/2011 | Lawrence | 52/656.7 |
| 8,403,431 | B2 * | 3/2013 | Elkins et al. | 312/265.1 |
| 8,562,084 | B2 * | 10/2013 | Chen | 312/296 |
| 8,652,382 | B2 * | 2/2014 | Eggert et al. | 264/261 |
| 2001/0037988 | A1 * | 11/2001 | Knab et al. | 211/189 |
| 2008/0060314 | A1 | 3/2008 | Davies | |

* cited by examiner

STRUCTURAL PROFILE SYSTEM

CROSS-REFERENCE TO RELATED APPLICATIONS

Pursuant to 35 U.S.C. 119 and the Paris Convention Treaty this application claims the benefit of Polish Patent Application No. P. 402660 filed on Feb. 4, 2013, the contents of which are incorporated herein by reference.

BACKGROUND OF THE INVENTION

1. Field of the Invention

Technical concept presented herein relates to a set of profiles for forming complex profiles, a complex profile, a structure made from profiles and a method for creating structures from profiles, for example, structures for billboards, display cabinets, glazed cabinets and constructions.

2. Description of the Related Art

The high prices of traditional raw materials such as wood used for spatial or flat structures caused that several structures including the frames of windows, doors and facade elements, are now largely made of metal, plastics or combinations thereof and the complements to these structures are window panes, mainly insulating glass units. The commonest structures, such as window and door frames are made of plastic profiles, for example PVC, and consist of four elements cut at a specific angle and connected together. The plastic profiles may be strengthened with metal elements.

Often, the plastic profiles are welded to each other. In other solutions, profiles are connected together by means of corners. For example, from the international application publication WO 99/55996 A1 titled "Device for an angle joint of plastic hollow sections" published also as PL 193379 B1 a kit is known for an angle connection of plastic hollow profiles, which are ended at least partially with a cant situated in the cant plane and which contain adhesive and plastic inserts in the form of bodies for joining the hollow profiles in their cant. Plastic inserts are embedded at least partially in metal chambers. On the insert member, recesses in the form of pockets are formed for adhesive which is introduced there and after hardening binds the insert to the profiles.

From the publication CA 2561334 A1 titled "A joint frame for the frames of doors and windows" an L-shaped element is known for joining profiles placed at a 90° angle in relation to each other.

From the publication US 2008/060314 A1 entitled "Corner joint for pultruded window frame" a corner element is known having legs located at an angle in relation to each other, of which each is embedded in chambers of various profiles. Surfaces of the legs are covered with adhesive layers, which enable durable connection of various profiles together by means of the corner element.

While in the case of flat structures, such as frames of windows and doors, the aforementioned connections provide the flat structures with sufficient rigidity and strength, however, it is difficult to obtain the adequate rigidity and precision of connections of the currently known profiles used in spatial structures.

SUMMARY OF THE INVENTION

It is an object of the present invention to provide profiles, thanks to which the high precision fitting of profiles will be achievable, particularly at the points of their angle connections, which in turn will ensure the required stiffness and strength of the structures, in particular spatial structures.

This objective is achieved by a set of profiles for forming complex profiles comprising two adjoining profiles having walls surrounding a main chamber. Each profile, namely a first profile and a second profile, has an inner wall with a faying face without protruding fragments, and an angle between the faying face and an outer surface of a side wall of a first profile and a second profile is no greater than 90°, and after adjoining the first profile and the second profile with faying faces, in order to form a complex profile, the outer surfaces of the side walls of the first profile and the second profile are situated outside and the angle between them equals the sum of the angle between the faying face and the outer surface of the side wall of the first profile and the angle between the faying face and outer surface of the side wall of the second profile.

It is advisable to that after adjoining the first profile and the second profile with faying faces a straight line situated in a cross-section plane of the first profile and the second profile and passing through the faying faces and a straight line situated in the cross-section plane of the first profile and passing through the outer surface of side wall of the first profile, or tangential to it, and a straight line situated in the cross-section plane of the second profile and passing through the outer surface of side wall of the second profile, or tangential to it, intersect together at one point.

Upon adjoining the first profile and the second profile with faying faces, the second profile may be a mirror image of the first profile in relation to the adjoining faying faces.

The first profile and the second profile can be pieces of an identical metal section or an identical plastic section.

Within a main chamber of the first profile may be located an auxiliary chamber of the first profile and the auxiliary chamber can be separated from a remainder space of the main chamber by a guiding element situated parallel to the main wall whereas within the main chamber of the second profile an auxiliary chamber of the second profile can be located and the auxiliary chamber can be separated from a remainder space of the second main chamber by a guiding element situated parallel to the main wall and a cross-section of the main chamber and the auxiliary chamber of the first profile can have shape and dimensions of a cross-section of the main chamber and the auxiliary chamber of the second profile.

From the set of profiles can be formed a complex profile comprising two adjoining profiles with walls surrounding the main chamber of each profile. Each profile of the complex profile, namely the first profile and the second profile or the first metal or plastic section and the second metal or plastic section, can comprise an additional wall protruding beyond a connection point of the side wall and the main wall, and a surface of the additional wall and a surface of the main wall facing each other limit a space for a filling material.

A straight line which passes through contact surface of the first profile and second profile forming the complex profile and straight lines which pass through the outer surface of the side wall of the first profile and second profile and lying in a cross-section of the complex profile may intersect in one place.

The second profile of the complex profile may be a mirror image of the first profile of the complex profile in relation to the contact surface of the first profile and the second profile.

The first profile and the second profile of the complex profile may be connected together by means of a temporary fastening, in particular by means of a bolt and nut, or by means of a permanent fastening, in particular by using a gluing or welding.

Furthermore, the subject matter of the solution is a structure made from connected profiles with walls surrounding a main chamber, of which one is a main wall. At least one profile of the structure is a second profile of a first set of profiles comprising a first profile having a first inner wall with a first faying surface without protruding fragments, a first side wall having a first outer surface situated at a first angle α to the first faying face no greater than 90°, a first main wall placed between the first inner wall and the first side wall and connected to at least one of the first inner wall and the first side wall, a first main chamber surrounded by at least fragments of the first inner wall, the first side wall and the first main wall, a first guiding element situated in the first main chamber to guide a first corner piece for reinforcing connection with another profile having a longitudinal axis situated at an angle to a longitudinal axis of the first profile. Said second profile is adjoinable to the first profile and has a second inner wall with a second faying surface without protruding fragments and having shape of the first faying surface, a second side wall having a second outer surface situated at a second angle β to the second faying face no greater than 90°, a second main wall placed between the second inner wall and the second side wall and connected to at least one of the second inner wall and the second side wall, a second main chamber surrounded by at least fragments of the second inner wall, the second side wall and the second main wall, and a second guiding element situated in the second main chamber to guide a second corner piece for reinforcing connection with another profile having a longitudinal axis situated at an angle to a longitudinal axis of the second profile. Furthermore, the structure has a complex profile comprising a third profile and a fourth profile, of which each has an inner wall with a faying face without protruding fragments, and an angle between the faying face and an outer surface of a side wall of the first profile and the second profile is no greater than 90°, and the third profile and the fourth profile are connected to each other and they are adjoining with the faying faces, and outer surfaces of the side walls of the third profile and the fourth profile are situated outside, and an angle between them equals the sum of an angle between the faying face and the outer surface of the side wall of the third profile and an angle between the faying face and the outer surface of the side wall of the fourth profile. At the connection point of the complex profile and other profiles whose longitudinal axes are placed at an angle to a longitudinal axis of the complex profile, the third profile of the complex profile, at the point of its connection with the second profile which is connected to the third profile at an angle, has a bevel whose surface is disposed at right angle to the plane where longitudinal axes of the profiles being connected are situated, and placed at an angle complementing an angle between the longitudinal axes of the profiles being connected located at an angle in relation to each other, with a value that equals the difference between the angle between the longitudinal axes of the profiles being connected and an angle of a bevel surface of the second profile, and the fourth profile of the complex profile at the point of its connection with a fifth profile has a bevel whose surface is disposed at right angle to the plane, where longitudinal axes of the profiles being connected are situated, and placed at an angle complementing the angle between the longitudinal axes of the profiles being connected located at an angle in relation to each other, with a value that equals the difference between the angle between the longitudinal axes of the profile being connected and an angle of the bevel surface of the fourth profile measured in the plane where the longitudinal axes of profiles being connected are situated. A guiding element can be situated in each main chamber to guide a corner joint reinforcing connection with another profile.

Within the main chamber of profiles connected together at an angle, in order to create the structure, auxiliary chambers may be located whose longitudinal axes may be parallel to the longitudinal axes of the profiles, wherein a connection may be reinforced with a corner joint whose longitudinal axes of arms embedded in the auxiliary chambers of the profiles being connected are placed at an angle that equals the angle between the longitudinal axes of the auxiliary chambers of the profiles being connected.

The auxiliary chamber of the profile creating the structure may be separated from the rest of the main chamber by means of guiding elements.

The object of the present invention is also to provide a method for creating structures from connected together profiles with walls surrounding a main chamber, of which one is a main wall and at least one profile of the structure is a complex profile comprising a first profile and a second profile, of which each has an inner wall with a faying face without protruding fragments, and an angle between the faying face and an outer surface of a side wall of the first profile and the second profile is no greater than 90° characterized in that, from the profiles whose longitudinal axes are situated in one plane, a frame is formed whose, at least, one profile is a complex profile comprising a third profile and a fourth profile where one is a mirror image of the other and they are connected together and they are adjoining with the faying faces, and outer surfaces of side walls of the third profile and the fourth profile are situated outside, and an angle between them equals the sum of an angle between the faying face and the outer surface of the side wall of the third profile and an angle between the faying face and the outer surface of the side wall of the fourth profile, wherein, at the connection point of the complex profile and other profiles, whose longitudinal axes are placed at an angle to a longitudinal axis of the complex profile, the third profile of the complex profile, at the point of its connection with the second profile, which is connected to the third profile at an angle, has a bevel, whose surface is disposed at right angle to the plane where the longitudinal axes of the profiles being connected are situated, and placed at an angle complementing the angle between the longitudinal axes of the profiles being connected located at an angle in relation to each other with a value that equals the difference between the angle between the longitudinal axes of the profiles being connected and the angle of a bevel surface of the second profile, and the fourth profile of the complex profile, at the point of its connection with a fifth profile, has a bevel, whose surface is disposed at right angle to the plane where longitudinal axes of the profiles being connected are situated, and placed at an angle complementing an angle between the longitudinal axes of the profiles being connected located at an angle in relation to each other, with a value that equals the difference between an angle between the longitudinal axes of the profiles being connected and an angle of the bevel surface of the fourth profile measured in the plane where the longitudinal axes are situated. By connecting profiles together, arms of the corner joint are inserted into an auxiliary chamber of the profiles being connected.

BRIEF DESCRIPTION OF THE DRAWINGS

This and other objects as well as advantageous features of the technical concept presented herein are accomplished in accordance with the principles of the presented technical concept by providing profiles and structures made from connected profiles as well as a method for creating structures from profiles. Further details and features of the profiles and structures made of connected profiles as well as the method for creating structures from profiles, their nature and various advantages will become more apparent from the accompanying drawings and the following detailed description of the preferred embodiments shown in a drawing, in which.

DETAILED DESCRIPTION OF EMBODIMENTS

Figure 1:
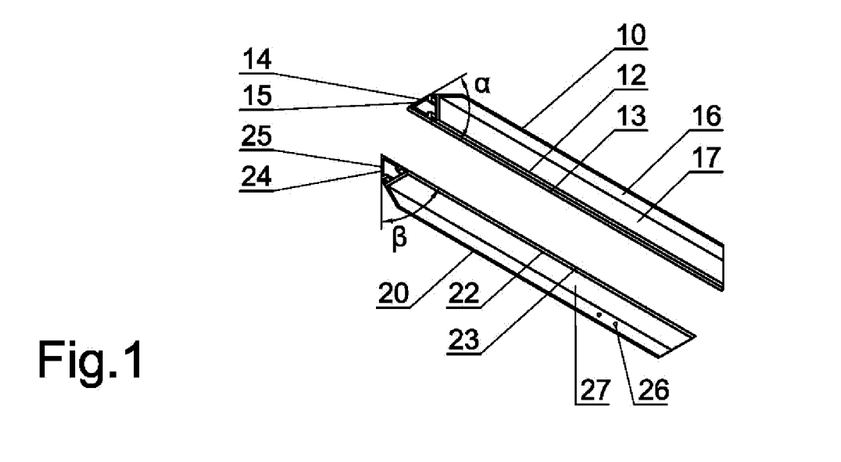
FIG. 1 shows an axonometric view of a set of profiles for forming profiles.
Figure 2:
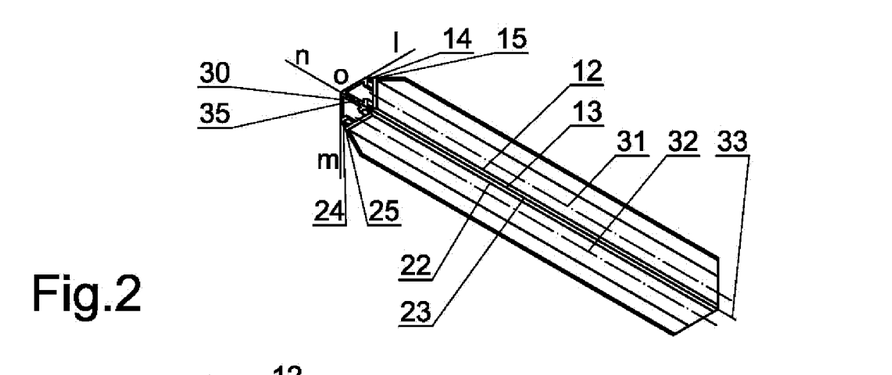
FIG. 2 shows an axonometric view of a complex profile.

A set of profiles or sections for forming complex profiles or sections shown in FIG. 1 comprises two profiles or sections, namely a first profile 10 or a first section 10 and a second profile 20 or a second section 20, adjoining each other and having walls surrounding a main chamber. Each profile 10, 20 from a set of profiles as well as from an embodiment of the complex profile 30 shown in FIG. 2, has an outer shape which may be inscribed into a triangle, and has an inner wall, for example a first inner wall 12 and a second inner wall 22, respectively, with a faying face, for example a first faying face 13 and a second faying face 23, respectively, without protruding fragments. FIG. 2 may present both the set of profiles and the complex profile. Faying faces 13, 23 adjoining each other, after being coated with adhesive enable a joint 35 to be created when the complex profile is discussed, however, in the case of the set of the profiles they are considered to be contact surfaces 35. A structure of the profiles 10, 20 is shown in more detail in FIG. 3, where a cross-section of the complex profile 30 is presented, whose longitudinal axis 33 is parallel to longitudinal axes 31, 32 of the profiles 10, 20. The first main chamber 18 of the first profile 10 is surrounded sequentially by the first inner wall 12, a first connecting wall 11, a first side wall 14 and a first main wall 17. Then, the second main chamber 28 of the second profile 20 is surrounded sequentially by the second inner wall 22, a second connecting wall 21, a second side wall 24 and a second main wall 27. The first profile and the second profile can be pieces of an identical metal section or plastic section. From FIG. 3 results that the angle $\alpha$, $\beta$ between the faying face, respectively 13 and 23, and an outer surface, respectively 15 and 25 of the side wall, respectively 14 and 24 of the first profile 10 and the second profile 20, is no greater than 90°, and in particular is 45°. After adjoining the first profile 10 and the second profile 20 with the faying faces 13, 23, in order to form the complex profile 30, the outer surfaces, respectively 15 and 25 of the side walls, respectively 14 and 24 of the first profile 10 and the second profile 20, are situated outside, and the angle $\gamma$ between them equals the sum of the angle $\alpha$ between the faying face 13 and the outer surface 15 of the side wall 14 of the first profile 10 and the angle $\beta$ between the faying face 23 and the outer surface 25 of the side wall 24 of the second profile 20. In particular, the angle $\gamma$ between the outer surface 15, or the tangent to the surface of the side wall 14 of the first profile 10 and the outer surface 25, or the tangent to the surface of the side wall 24 of the second profile 20 is 90°.

Figure 3:
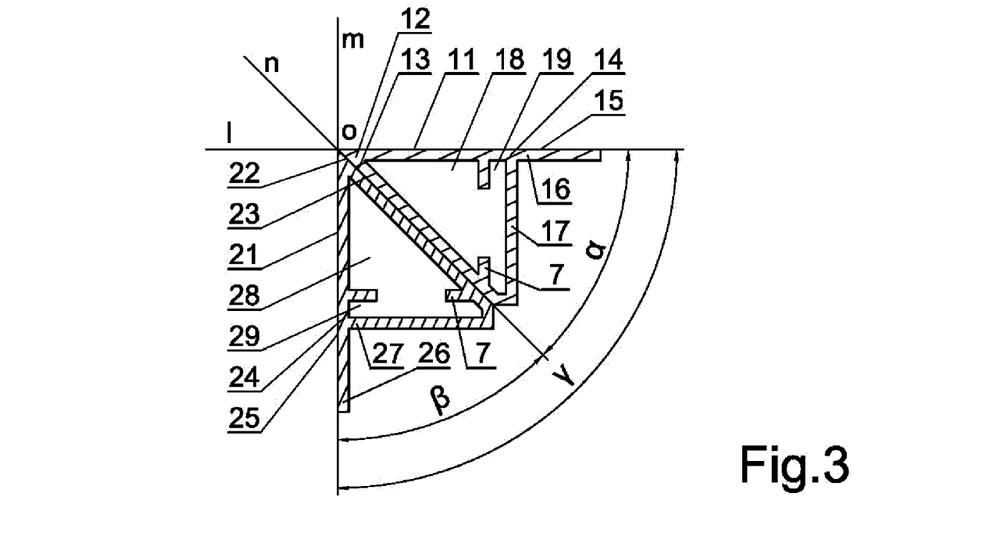
FIG. 3 shows a cross-section of a first embodiment of the complex profile.

In one embodiment, after adjoining the first profile 10 and the second profile 20 with the faying faces, a straight line n lying in the plane of the cross-section of the first profile 10 and the second profile 20 and passing through the faying faces 13, 23, and a straight line l lying in the plane of the cross-section of the first profile 10 and passing through the outer surface 15 of the side wall 14 of the first profile 10, or tangential to it, and a straight line m lying in the plane of the cross-section of the second profile 20 and passing through the outer surface 25 of the side wall 24 of the second profile 20, or tangential to it, intersect together at one point O. The side wall 14 of the first profile 10 changes over into or protrudes as an additional wall 16 of the first profile 10, with which at an angle, mostly at an angle of 90°, the main wall 17 is congruent. With the main wall 17 a face of a filling material inserted into the structure is adjacent, for example, a window pane, an insulating glass or an insulating panel, and with the additional wall 16 is adjacent, e.g. is pressed against, the surface of the aforementioned inserted material, which is not shown in this drawing. Similarly, the side wall 24 of the second profile 20 changes over into or protrudes as an additional wall 26 of the second profile 20, with which at an angle, mostly at an angle of 90°, the main wall 27 is congruent. With the main wall 27 the face of the filling material inserted into the structure is adjacent, for example, the window pane, the insulating glass or the insulating panel, and with the additional wall 26 is adjacent or contacts, e.g. is pressed against, the surface of the aforementioned inserted material, which is not shown in this drawing.

In one of the embodiments, after adjoining the first profile 10 and the second profile 20 with the faying faces 13, 23, the second profile 20 is a mirror image of the first profile 10 in relation to the adjoining faying faces 13, 23. In particular, FIG. 3 shows that within the main chamber 18 of the first profile 10, an auxiliary chamber 19 of the first profile 10 is located. The auxiliary chamber 19 is separated from a remainder space of the main chamber by a guiding element 7 situated parallel to the main wall 17. Thanks to the guiding element an intersection of the auxiliary chamber 19 has a cross-section in the shape of a rectangle with possible chamfers or roundings. The auxiliary chamber 19 is positioned adjacent the main wall 17, which is also a wall of the auxiliary chamber 19. The shape and dimensions of the auxiliary chamber correspond to the shape and dimensions of arms of a corner joint, for example an angle bar, which is used for stiffening or reinforcing the corner connection of two profiles of the construction located at an angle in relation to each other. The fact that the auxiliary chamber 19 is situated next to the main wall 17 facilitates the embedding of the angle bar, which stiffens the corner connection and at the same time surrounds a corner of material inserted or built into the structure made from the profiles. Similarly, within the main chamber 28 of the second profile 20 an auxiliary chamber 29 of the second profile 20 is located, which is separated by means of the guiding elements 7. The cross-section of the main chamber 18 and the auxiliary chamber 19 of the first profile 10 has the same shapes and dimensions as the cross-section of the main chamber 28 and the auxiliary chamber 29 of the second profile 20. The terms "first" and "second" for better understanding the description may be replace by terms "third" and "fourth" or "fifth" and "sixth".

Figure 4:
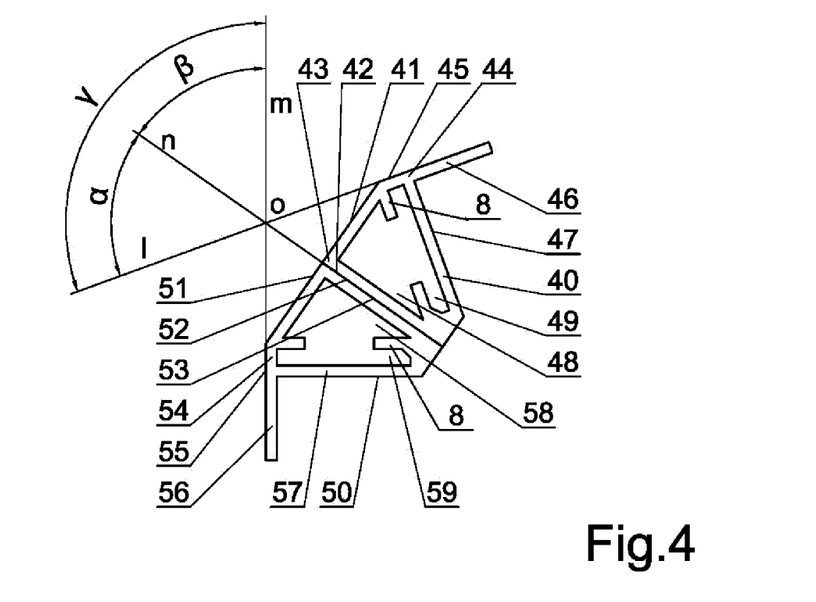
FIG. 4 shows a cross-section of a second embodiment of the complex profile.

In FIGS. 4 and 5 sets of two profiles or complex profiles are shown with the basic features described in the embodiment shown in FIGS. 1, 2 and 3. A set of two profiles 40, 50 from FIG. 4, which are touching with faying surfaces 43, 53 of inner walls 42, 52, differs from the set of two profiles which is shown in FIG. 1, in that connecting walls 41, 51 are not a rectilinear extension of side walls 44, 54, and their outer surfaces 45,55, respectively, but are deflected and go closer to the centre of the first profile 40 and of the second profile 50. This configuration of the connecting walls 41, 51 causes the complex profiles made from these profiles have no sharp bevels. The next difference is, that the angle γ between the outer surfaces 45, 55, which equals the sum of the angle α between the faying face 43 and the outer surface 45 of the side wall 44 of the first profile 40 and the angle β between the faying face 53 and the outer surface 55 of the side wall 54 of the second profile 50, is greater than 90°, and, for example, it is 120°, which is useful when the structure is formed in the shape of a prism with a base which has the shape of a hexagon. A main chamber 48 of the profile 40 is surrounded sequentially by the aforementioned inner wall 42, the connecting wall 41, the side wall 44 and a main wall 47, with which at an angle an additional wall 46 is connected. In turn a main chamber 58 of the profile 50 is surrounded sequentially, by the inner wall 52, the connecting wall 51, the side wall 54 and a main wall 57, with which at an angle an additional wall 56 is connected. Within the main chamber 48 of the first profile 40, an auxiliary chamber 49 of the first profile 40 is located. The auxiliary chamber 49 is separated from the main chamber 48 by means of guiding elements 8. Similarly, within the main chamber 58 of the second profile 50 an auxiliary chamber 59 of the second profile 50 is located, which is separated by means of the guiding elements 8.

Figure 5:
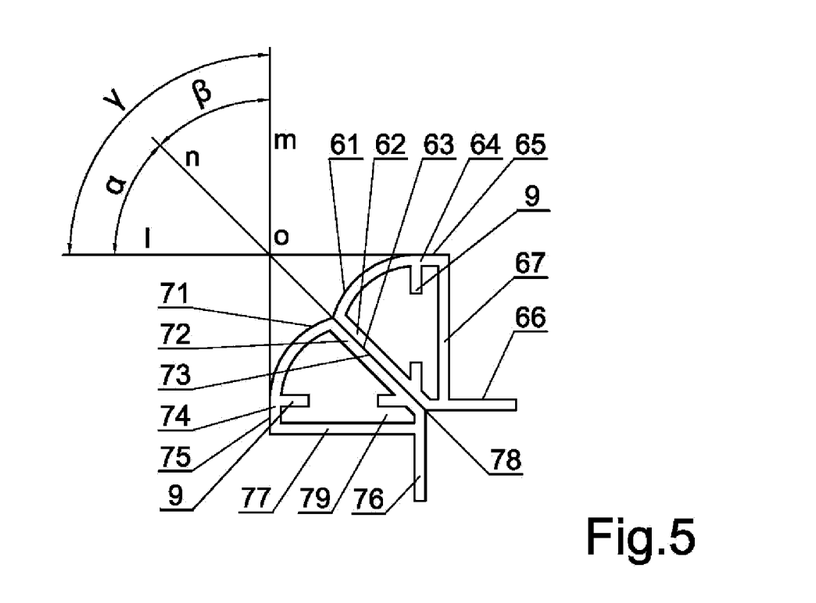
FIG. 5 shows a cross-section of a third solution of the complex profile.

Then, a set of two profiles 60, 70 from FIG. 5 differs from the set of two profiles 10, 20, which is shown in FIG. 1, in that connecting walls 61, 71 are cylindrical sectors, not flat walls, and after adjoining the profiles 60, 70 to faying faces 63, 73 of inner walls 62, 72, they may create two bulges on a complex profile front. After appropriate selection of a curvature of cylindrical sectors of the connecting walls 61, 71, the front of the created complex profile may have an outer surface with one curvature. The next difference is that, additional walls 66, 76 of the first profile 60 and the second profile 70, which are situated at the confluence of main walls 67, 77 and the inner walls 62, 72, and not as in the case of profiles from FIG. 1 at the confluence of side walls and the main walls. Furthermore, the straight lines l and m are tangential to outer surfaces 65, 75 of side walls 64, 74 of the first profile 60 and the second profile 70 rather, than straight lines passing through those surfaces. Whereas auxiliary chambers 69, 79 have shapes similar to the aforementioned auxiliary chambers and they are separated within main chambers by means of guiding elements 9. In the embodiment shown in FIG. 5, the profiles 60, 70 are connected together by means of a permanent fastening, for example, by welding. Usually, welds 78 are located in places where they will not disturb the assembly of filling materials of structures made from complex profiles. The profiles may be connected to each other also by means of other permanent fastening, for example, by means of an adhesive, or by means of a temporary fastening, particularly by means of a bolt and nut, or by combination of connection using the bolt and nut, and the adhesive or welding.

FIGS. 2, 3, 4 and 5 are also used to present the complex profiles adjoining each other and having walls surrounding the main chamber, however, in FIGS. 4 and 5 is not marked sectional hatching required when drawing cross-sections to avoid obscure figure. The complex profiles are shown in FIGS. 3, 4 and 5. Each profile has the inner wall with the faying face without protruding fragments, and the angle between the faying face and the outer surface of the side wall of the first profile and the second profile is no greater than 90°, the first profile and the second profile are connected together and they are adjoining with the faying faces, and the outer surfaces of the side walls of the first profile and the second profile are situated outside, and the angle between them equals the sum of the angle between the faying face and the outer surface of the side wall of the first profile and the angle between the faying face and the outer surface of the side wall of the second profile. Furthermore, a straight line which passes through the contact surface of the first profile and the second profile and the straight lines which pass through the outer surface of the side wall of the first profile and the second profile situated in the cross-section plane of the complex profile intersect together at one point O. It follows from FIGS. 4 and 5 that the second profile is a mirror image of the first profile in relation to the faying faces of the first profile and the second profile, and within the main chamber of the first profile the auxiliary chamber of the first profile is located, and within the main chamber of the second profile the auxiliary chamber of the second profile is located, and the cross-section of the auxiliary chamber of the first profile has the same shape and dimensions as the cross-section of the auxiliary chamber of the second profile. The complex profile realized at acceptable costs has the same profiles, and the difference with which we are dealing is such that they are symmetrically placed in relation to their contact plane when the complex profile is formed.

Figure 6:
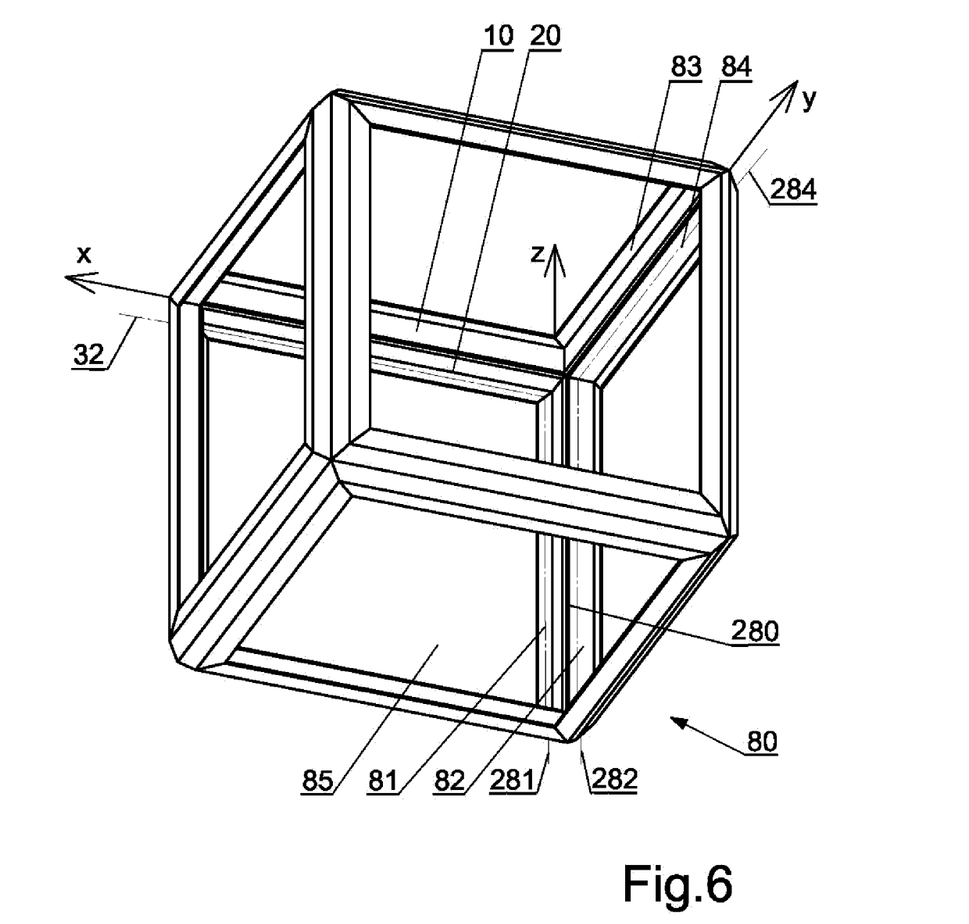
FIG. 6 shows obliquely from the bottom an axonometric view of a spatial structure in a shape of a cuboid.
Figure 7:
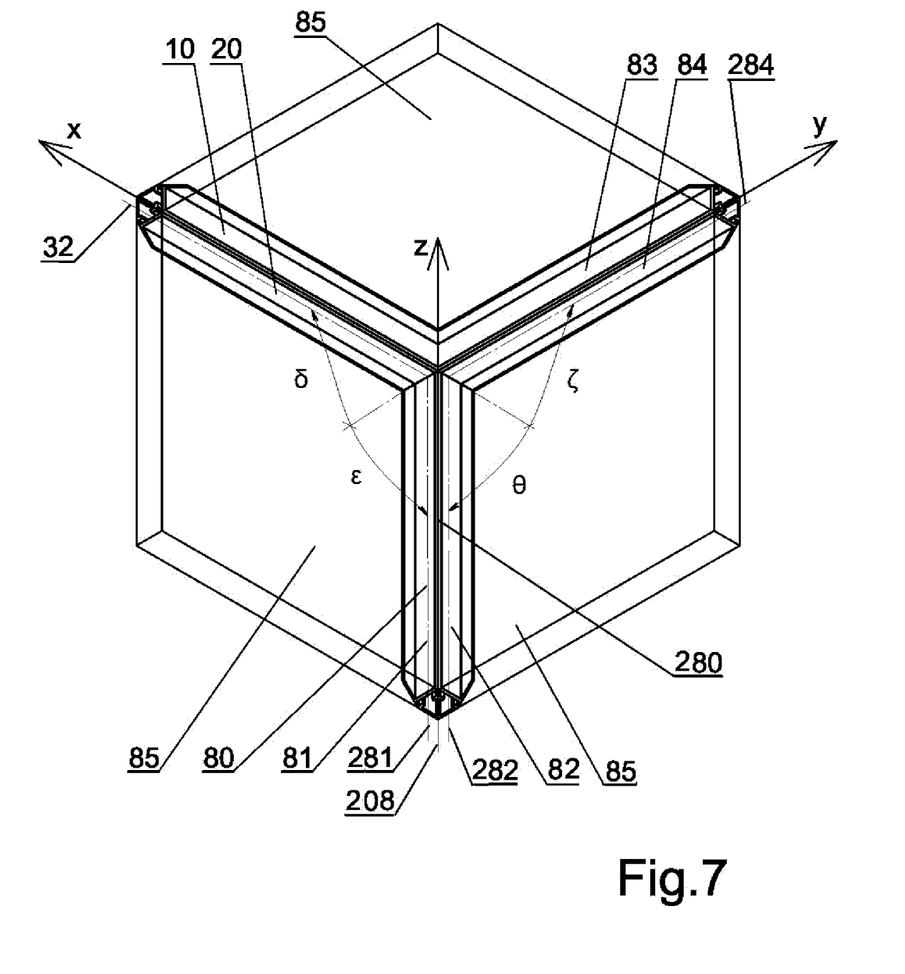
FIG. 7 shows an isometric view of a spatial structure corner with material inserted.
Figure 8:
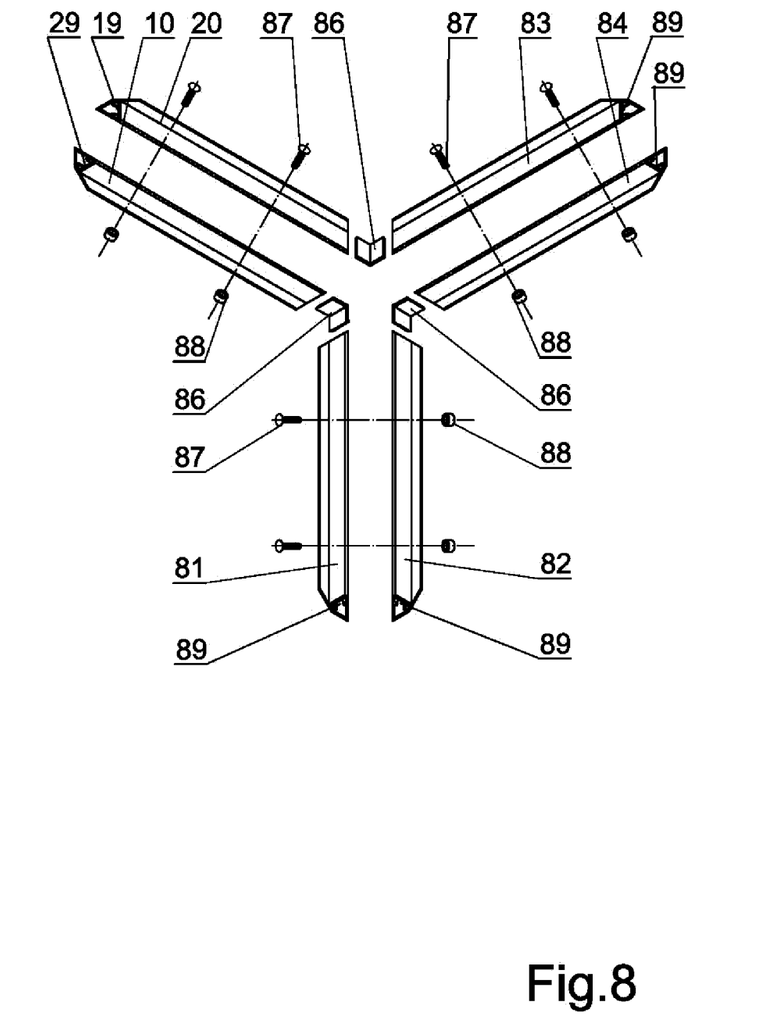
FIG. 8 shows an exploded isometric view of the spatial structure corner.

FIG. 6 shows obliquely from the bottom an axonometric view of a structure formed as a spatial structure 80, for example, a glazed cabinet in a shape of a cuboid having at least one main wall with a frame made from a set of profiles described before. At least one of the walls has a filling material 85 surrounded by the frame. FIG. 7 shows an axonometric view of the spatial structure with the filling material 85, and FIG. 8 shows an exploded isometric view of a spatial structure corner. The structure from FIGS. 6, 7 and 8 is the spatial structure 80, made of sets of profiles of complex profiles comprising profiles 10, 20, 81, 82, 83, 84 connected to each other and having walls surrounding a main chamber, of which one wall is a main wall. The spatial structure 80, whose features in particular are pointed out in FIG. 7, characterized in that at least one profile of the structure is a set of profiles or a complex profile 280 comprising the third profile 81 and the fourth profile 82, of which each has an inner wall with a faying face without protruding fragments, and an angle between the faying face and an outer surface of a side wall of the first profile and the second profile is no greater than 90°, and the third profile 81 and fourth profile 82 are connected together and they are adjoining with the faying faces, and the outer surfaces of the side walls of the third profile 81 and the fourth profile 82 are situated outside, and an angle between them equals the sum of an angle between the faying face and the outer surface of the side wall of the third profile 81 and an angle between the faying face and the outer surface of the side wall of the fourth profile 82. At the connection point of the complex profile 280 and other profiles 20, 84, whose longitudinal axes 32, 284 are placed at an angle to a longitudinal axis 208 of the complex profile 280, the third profile 81 of the complex profile 280, at the point of its connection with the second profile 20 which is connected to the third profile 81 at an angle, has a bevel whose surface is disposed at right angle to the plane where longitudinal axes 32, 281 of the profiles 20, 81 being connected are situated, and placed at an angle ε complementing an angle between the longitudinal axes 32, 281 of the profiles 20, 81 being connected, located at an angle in relation to each other with a value that equals the difference between the angle between the longitudinal axes 32, 281 of the profile 20, 81 being connected and an angle δ of a bevel surface of the second profile 20, and the fourth profile 82 of the complex profile 280 at the point of its connection to the fifth profile 84 has a bevel whose surface is disposed at right angle to the plane where the longitudinal axes 282, 284 of the profiles 82, 84 being connected are situated, and at an angle θ complementing the angle between the longitudinal axes of profiles 82, 84 being connected, located at an angle in relation to each other, with a value that equals the difference between the angle between the longitudinal axes of the profiles 82, 84 being connected and an angle ζ of the bevel surface of the fourth profile 82 measured in the plane where the longitudinal axes 282, 284 of the profile 82, 84 being connected are situated. Such above-described configuration of the complex profiles, for connecting with other profiles is present in each connection of the complex profiles with other profiles, which are positioned at an angle to the complex profile, in particular in the case of the glazed cabinet shown in FIG. 6, whose inserted filling materials 85, for example wood panels, glass or complex glass panes. The glass may be replaced by insulating panels, in particular in the case of construction of cooling devices, such as refrigerated counters, freezers and refrigerators. Definitions such as the first profile, the second profile, the third profile, the fourth profile, etc., in this description are used only to enable description of the structures. These definitions may be used interchangeably and they do not limit in any way the scope of a solution protection.

Within the main chamber of the profiles connected to each other at an angle, auxiliary chambers 19, 29, 89 are located, which are marked in FIG. 8, whose longitudinal axes are parallel to the longitudinal axes of the profiles, wherein, the connection is reinforced with a corner piece or a corner joint 86, whose longitudinal axes of arms embedded in the auxiliary chambers of the profiles being connected are placed at an angle that equals an angle between the longitudinal axes of the auxiliary chambers of the profiles being connected. The auxiliary chamber is separated from a remainder space or rest of the main chamber by means of guiding elements. In the embodiment shown in FIG. 8, the profiles 10 and 20, 81 and 82, 83 and 84 of the complex profiles are connected to each other by means of a temporary fastening, namely with bolts 87 and nuts 88.

Generally, assembly of a structure, for example, a glazed cabinet or shelving refrigeration, begins with cutting profiles at an appropriate angle and to the length resulting from the particular structure dimensions. From the cut profiles side walls, as well as a bottom and a lid are made as flat rectangular frames by connecting the profiles at corners by means of angle bars, electric welding, gluing or welding. Such prepared walls, together with the bottom and the lid, are assembled to form a solid/lump, mostly in the shape of a prism. Generally, for assembling bolts are used to connect frames together in a parting plane, or the frames are welded to each other. Into the resulting solid fillings are mounted, for example, three walls have complex glass panes installed while insulating panels are inserted into the lid and bottom. For fastening the filling are used inner corner pieces, which are most often screwed down to the main structure by bolts. On one selected wall of the structure a glass door is mounted. The glass door may also replace the lid of the structure. The filling may be made of different materials of different thickness. In one embodiment one of the walls is left unfilled and without door.

Figure 9:
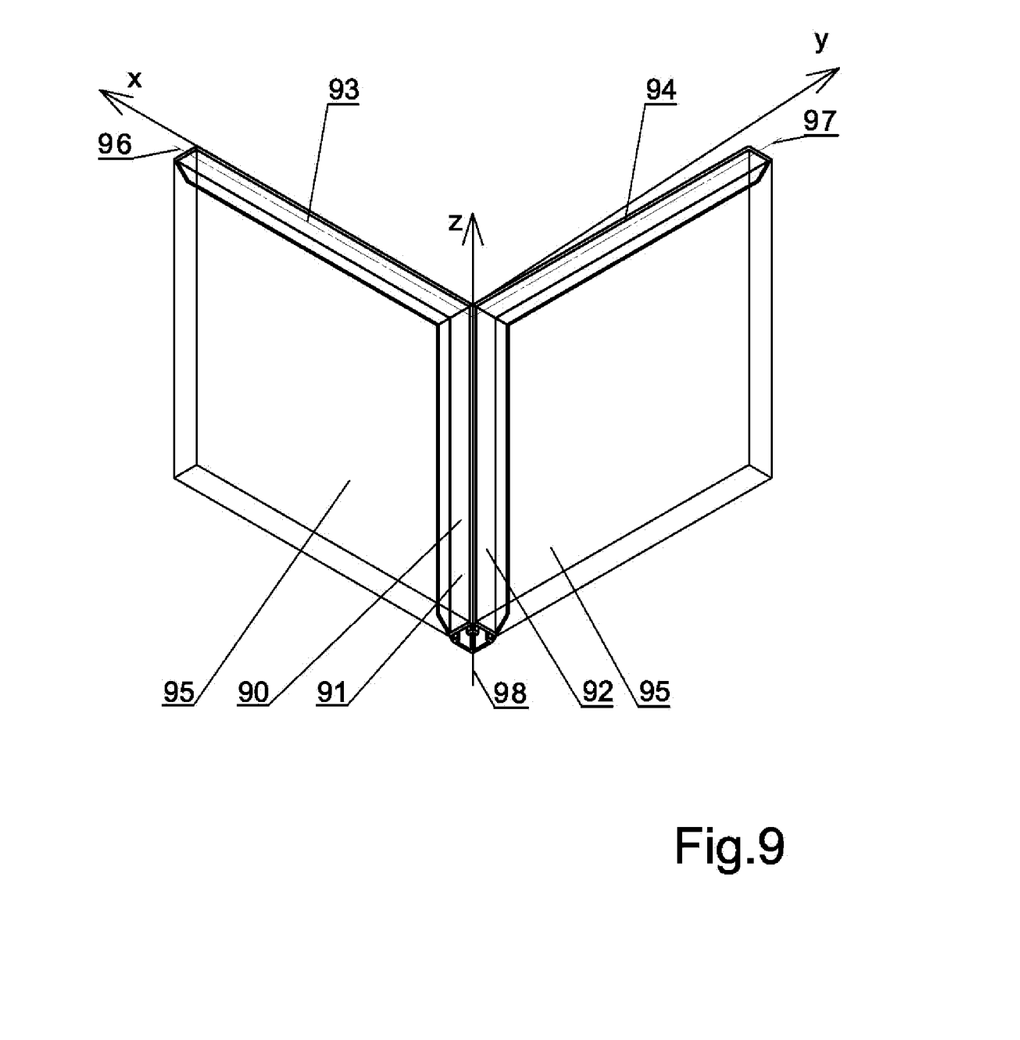
FIG. 9 shows an axonometric view of the corner of the spatial structure in the shape of a prism whose profiles situated in the plane xy are single profiles, for example angle bars.

In FIG. 9 is shown an example connection of a complex profile 90 consisting of profiles 91, 92 combined with profiles 93, 94, for example, angle bars, whose longitudinal axes 96, 97 are located at an angle to a longitudinal axis 98 of the complex profile 90. This construction of a structure joint may occur when a structure is opened from a top and there is no need to use the complex profiles horizontally, which could facilitate the installation of horizontal filling, as occurs in the case of two embedded vertical glass panes 95 located at an angle in relation to each other.

Figure 10A:
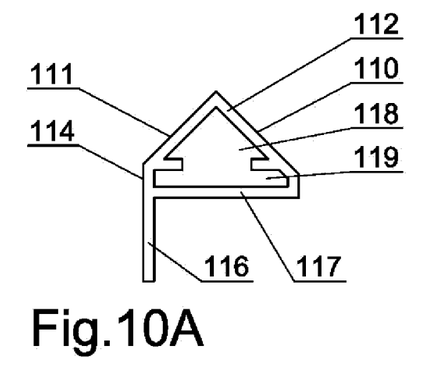
FIGS. 10A to 10K show cross-sections of various profiles for forming complex profiles.
Figure 10B:
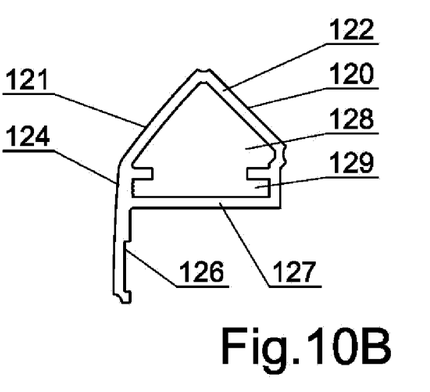
Figure 10C:
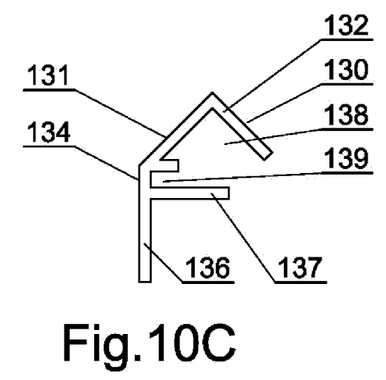
Figure 10D:
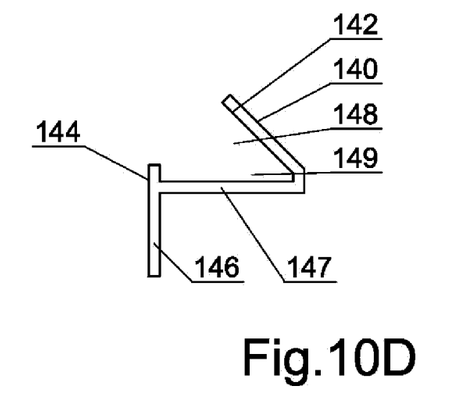
Figures 10E, 10F, 10G:
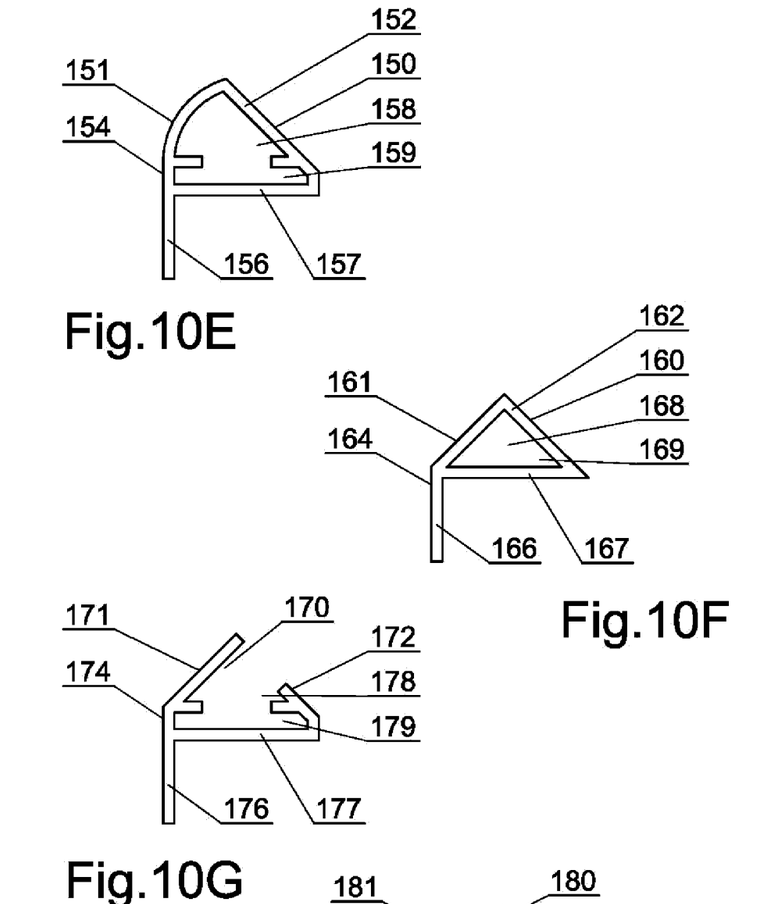
Figure 10H:
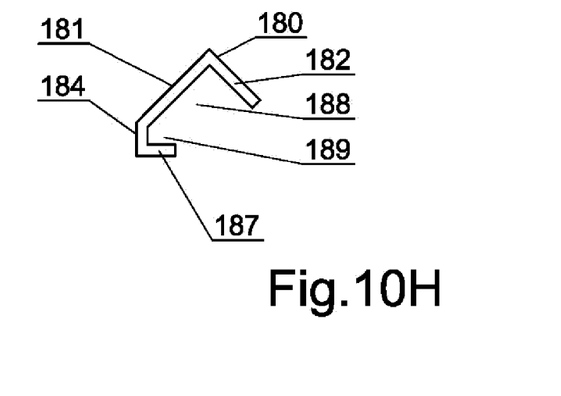
Figure 10I:
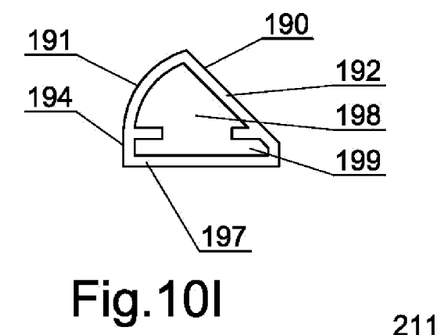
Figure 10J:
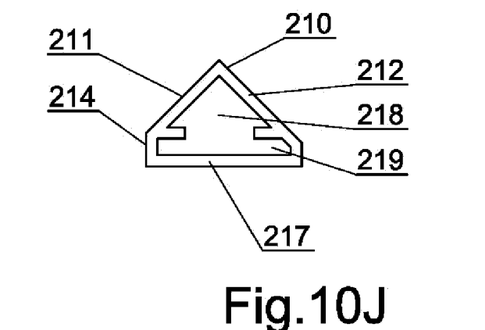
Figure 10K:
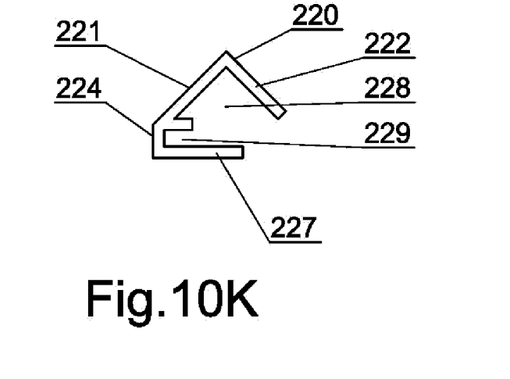

FIGS. 10A to 10K show different cross-sections of profiles for forming complex profiles, as well as structures, which at least one profile is a complex profile. Thus, FIG. 10A shows a profile 110, whose main chamber 118, together with a separated auxiliary chamber 119 is surrounded sequentially by an inner wall 112, a connecting wall 111, a side wall 114 and a main wall 117. At the convergence point of the side wall 114 and the main wall 117 an additional wall 116 is situated, which is disposed at an angle to the main wall, for example, at an angle of 90°. The connecting wall 111 is flat or possibly has a slightly convex outer surface. FIG. 10B shows a profile 120, whose main chamber 128, together with a separated auxiliary chamber 129, and similarly to that in FIG. 10A, is surrounded sequentially by an inner wall 122, a connecting wall 121, a side wall 124 and a main wall 127. At the convergence point of the side wall 124 and the main wall 127 an additional wall 126 is situated, which is disposed at an angle to the main wall, for example, at an angle of 90°, and which has a recess where sealing material may be embedded. Some corners of this profile have semi-circular recesses. FIG. 10C shows a profile 130, which is similar to the profile in FIG. 10A, whose main chamber 138, together with a separated auxiliary chamber 139, is surrounded sequentially by an inner wall 132, a connecting wall 131, a side wall 134 and a main wall 137. At the convergence point of the side wall 134 and the main wall 137 an additional wall 136 is situated, which is disposed at an angle to the main wall 137, which is severed, fragmented and does not connect with the inner wall 132. A profile 140 from FIG. 10D is especially suitable for sealing materials embedded in a main chamber 148 with a separated auxiliary chamber 149, since it has no connecting wall and an inner wall 142 joins a main wall 147, to which an additional 146 is located at an angle. A side wall 144 is an extension of the additional wall 146. This profile has no guiding element. As the guiding element works the inner wall 142. FIG. 10E shows a profile 150, whose main chamber 158, together with a separated auxiliary chamber 159, is surrounded sequentially, by an inner wall 152, a connecting wall 151, a side wall 154 and a main wall 157. At the convergence point of the side wall 154 and the main wall 157 an additional wall 156 is situated. A characteristic feature of this profile is that the connecting wall 151 is rounded with a convex on the outside. FIG. 10F shows a profile 160, whose main chamber 168 has no clearly separated auxiliary chamber 169. The main chamber 168 of this profile is surrounded sequentially by an inner wall 162, a connecting wall 161, a side wall 164 and a main wall 167. At the convergence point of the side wall 164 and the main wall 167 an additional wall 166 is situated. FIG. 10G shows a profile 170, whose main chamber 178, together with a separated auxiliary chamber 179, is surrounded sequentially by a connecting wall 171, a side wall 174 and a main wall 177. At the convergence point of the side wall 174 and the main wall 177 an additional wall 176 is situated. A characteristic feature of this profile is an inner wall 172, which is fragmentary and does not connect with the connecting wall 171. The simplest shaped profile 180 is shown in FIG. 10H. A fragmentary main chamber 188, together with a separated fragmentary auxiliary chamber 189, is surrounded sequentially by an inner wall 182, a connecting wall 181, a side wall 184 and a fragmentary main wall 187. FIG. 10I shows a profile 190, whose shape is very similar to the profile in FIG. 10E, where the only difference is that the profile 190 has no additional wall. A main chamber 198, together with a separated auxiliary chamber 199, as in a case of the profile 150, is surrounded sequentially by an inner wall 192, a connecting wall 191, a side wall 194 and a main wall 197. FIG. 10J shows a profile 210, whose shape is very similar to the profile in FIG. 10A, where the only difference is that the profile 210 has no additional wall. A main chamber 218, together with a separated auxiliary chamber 219, as in a case of the profile 110, is surrounded sequentially, by an inner wall 212, a connecting wall 211, a side wall 214 and a main wall 217. While, FIG. 10K shows a profile 220, whose shape is very similar to the profile in FIG. 10C, where the only difference is that the profile 220 has no additional wall. A main chamber 228, together with a separated auxiliary chamber 229, is surrounded sequentially, by an inner wall 222, a connecting wall 221, a side wall 224 and a main wall 227, which is severed, fragmented and does not connect with the inner wall 222.

While the technical concept presented herein has been depicted, described, and has been defined with reference to particular preferred embodiments, such references and examples of implementation in the foregoing specification do not imply any limitation on the concept. It will, however, be evident that various modifications and changes may be made thereto without departing from the broader scope of the technical concept. The presented preferred embodiments are exemplary only, and are not exhaustive of the scope of the technical concept presented herein. Accordingly, the scope of protection is not limited to the preferred embodiments described in the specification, but is only limited by the claims that follow.

The invention claimed is:

1. A set of profiles for forming complex profiles comprising
    a first profile (10) having
        a first inner wall (12) with a first faying surface (13) without protruding fragments,
        a first side wall (14) having a first outer surface (15) situated at a first angle (α) to the first faying face (13) no greater than 90°,
        a first main wall (17) placed between the first inner wall (12) and the first side wall (14) and connected to at least one of the first inner wall (12) and the first side wall (14),
        a first main chamber surrounded by at least fragments of the first inner wall (12), the first side wall (14) and the first main wall,
        a first guiding element situated in the first main chamber to guide a first corner piece for reinforcing connection with another profile having a longitudinal axis situated at an angle to a longitudinal axis of the first profile;
    a second profile (20) adjoinable to the first profile and having
        a second inner wall (22) with a second faying surface (23) without protruding fragments and having shape of the first faying surface (13),
        a second side wall (24) having a second outer surface (25) situated at a second angle (β) to the second faying face (23) no greater than 90°,
        a second main wall (27) placed between the second inner wall (22) and the second side wall (24) and connected to at least one of the second inner wall (22) and the second side wall (24),
        a second main chamber surrounded by at least fragments of the second inner wall (22), the second side wall (24) and the second main wall, and
        a second guiding element (7) situated in the second main chamber to guide a second corner piece for reinforcing connection with another profile having a longitudinal axis situated at an angle to a longitudinal axis of the second profile,
    wherein after adjoining the first profile (10) and the second profile (20) by attaching the first faying face (13) to the second faying face (23) in order to create a complex profile (30), the first outer surface (15) of the first side walls (14) and the second outer surface (25) of the second side walls (24) are situated outside of the complex profile and a third angle (γ) between the first outer surface (15) and the second outer surface (25) equals to a sum of the first angle (α) between the first faying face (13) and the first outer surface (15) of the first side wall (14) of the first profile (10) and the second angle (β) between the second faying face (23) and the second outer surface (25) of the second side wall (24) of the second profile (20).

2. The set of profiles according to claim 1 wherein after adjoining the first profile (10) and the second profile (20) by attaching the first faying face (13) to the second faying face (23), a third straight line (n) situated in a cross-section plane of the first profile (10) and the second profile (20) and passing through the first faying face (13) and the second faying face (23) and a first straight line (l) situated in the cross-section plane of the first profile (10) and passing through the first outer surface (15) of the first side wall (14) of the first profile (10) or tangential to the first outer surface (15) of the first side wall (14) of the first profile (10) and a second straight line (m) situated in the cross-section plane of the second profile (20) and passing through the second outer surface (25) of the second side wall (24) of the second profile (20) or tangential to the second outer surface (25) of the second side wall (24) of the second profile (20) intersect together at one point (O).

3. The set of profiles according to claim 2 wherein within the first main chamber (18) of the first profile (10) a first auxiliary chamber (19) of the first profile (10) is located and the first auxiliary chamber (19) is separated from a remainder space of the first main chamber by the first guiding element (7) situated parallel to the first main wall (17) whereas within the second main chamber (28) of the second profile (20) a second auxiliary chamber (29) of the second profile (20) is located and the second auxiliary chamber (19) is separated from a remainder space of the second main chamber by the second guiding element (7) situated parallel to the second main wall (27) and a cross-section of the first main chamber (18) and the first auxiliary chamber (19) of the first profile (10) has shape and dimensions of a cross-section of the second main chamber (28) and the second auxiliary chamber (29) of the second profile (20).

4. The set of profiles according to claim 1 wherein after adjoining the first profile (10) and the second profile (20) by attaching the first faying face (13) to the second faying face (23), the second profile (20) is a mirror image of the first profile (10) in relation to the first adjoining faying face (13) and the second adjoining faying face 23).

5. The set of profiles according to claim 4 wherein within the first main chamber (18) of the first profile (10) a first auxiliary chamber (19) of the first profile (10) is located and the first auxiliary chamber (19) is separated from a remainder space of the first main chamber by the first guiding element (7) situated parallel to the first main wall (17) whereas within the second main chamber (28) of the second profile (20) a second auxiliary chamber (29) of the second profile (20) is located and the second auxiliary chamber (19) is separated from a remainder space of the second main chamber by the second guiding element (7) situated parallel to the second main wall (27) and a cross-section of the first main chamber (18) and the first auxiliary chamber (19) of the first profile (10) has shape and dimensions of a cross-section of the second main chamber (28) and the second auxiliary chamber (29) of the second profile (20).

6. The set of profiles according to claim 1 wherein the first profile (10) and the second profile (20) are pieces of an identical metal section or plastic section.

7. The set of profiles according to claim 1 wherein within the first main chamber (18) of the first profile (10) a first auxiliary chamber (19) of the first profile (10) is located and the first auxiliary chamber (19) is separated from a remainder space of the first main chamber by the first guiding element (7) situated parallel to the first main wall (17) whereas within the second main chamber (28) of the second profile (20) a second auxiliary chamber (29) of the second profile (20) is located and the second auxiliary chamber (19) is separated from a remainder space of the second main chamber by the second guiding element (7) situated parallel to the second main wall (27) and a cross-section of the first main chamber (18) and the first auxiliary chamber (19) of the first profile (10) has shape and dimensions of a cross-section of the second main chamber (28) and the second auxiliary chamber (29) of the second profile (20).

8. The set of profiles according to claim 1 wherein after adjoining the first profile (10) and the second profile (20) by attaching the first faying face (13) to the second faying face (23) in order to create the complex profile (30), the first profile and the second profile are connected together by means of a temporary fastening, especially by a bolt and a nut, or by means of a permanent fastening, especially by gluing or welding.

9. The set of profiles according to claim 1 wherein the second side wall (24) comprises an additional wall (26) protruding beyond a connection point of the second side wall (24) and the second main wall (27), and a surface of the additional wall (26) and a surface of the second main wall (27) facing each other limit a space for a filling material (85).

10. A structure comprising
a main chamber surrounded by walls whereas one of the walls is a main wall having
a frame made from profiles or sets of profiles whereas one of the profiles is a second profile (20) of a first set of profiles comprising
a first profile (10) having
a first inner wall (12) with a first faying surface (13) without protruding fragments,
a first side wall (14) having a first outer surface (15) situated at a first angle ($\alpha$) to the first faying face (13) no greater than 90°,
a first main wall (17) placed between the first inner wall (12) and the first side wall (14) and connected to at least one of the first inner wall (12) and the first side wall (14),
a first main chamber surrounded by at least fragments of the first inner wall (12), the first side wall (14) and the first main wall,
a first guiding element situated in the first main chamber to guide a first corner piece for reinforcing connection with another profile having a longitudinal axis situated at an angle to a longitudinal axis of the first profile;
said second profile (20) adjoinable to the first profile and having
a second inner wall (22) with a second faying surface (23) without protruding fragments and having shape of the first faying surface (13),
a second side wall (24) having a second outer surface (25) situated at a second angle ($\beta$) to the second faying face (23) no greater than 90°,
a second main wall (27) placed between the second inner wall (22) and the second side wall (24) and connected to at least one of the second inner wall (22) and the second side wall (24)
a second main chamber surrounded by at least fragments of the second inner wall (22), the second side wall (24) and the second main wall, and
a second guiding element (7) situated in the second main chamber to guide a second corner piece for reinforcing connection with another profile having a longitudinal axis situated at an angle to a longitudinal axis of the second profile,
and one of the sets of profiles is a second set (80) of profiles having
a third profile (81) having
a third inner wall with a third faying surface without protruding fragments,
a third side wall having a third outer surface situated at a third angle to the third faying face no greater than 90°,
a third main wall placed between the third inner wall and the third side wall and connected to at least one of the third inner wall and the third side wall,
a third main chamber surrounded by at least fragments of the first inner wall, the first side wall and first main wall, and
a third guiding element situated in the third main chamber to guide a third corner joint for reinforcing connection with another profile having a longitudinal axis situated at an angle to a longitudinal axis of the third profile;
a fourth profile (82) adjoined to the third profile (81) and having
a fourth inner wall with a fourth faying surface without protruding fragments attached to the third faying surface of the third profile,
a fourth side wall having a fourth outer surface situated at a fourth angle to the fourth faying face no greater than 90°,
a fourth main wall placed between the fourth inner wall and the fourth side wall and connected to at least one of the fourth inner wall and the fourth side wall,
a fourth main chamber surrounded by at least fragments of the first inner wall, the first side wall and first main wall, and
a fourth guiding element situated in the fourth main chamber to guide a fourth corner joint for reinforcing connection with another profile having a longitudinal axis situated at an angle to a longitudinal axis of the fourth profile,
wherein at a connection point of the second set of profiles (80), a second profile (20) and a fifth profile (84) whose longitudinal axes (32, 284) are placed at an angle to a longitudinal axis (208) of the second set (80) of profile, the third profile (81) of the second set of profile (80) at a point of its connection with the second profile (20) has a bevel with a bevel surface disposed at a right angle to a plane where a longitudinal axis (32) of the second profile (20) and a longitudinal axis (281) of the third profile (81) being connected are situated, and placed at an angle ($\epsilon$) complementing an angle between the longitudinal axis (32) and the longitudinal axis (281) of the profiles (20, 81) being connected located at an angle to each other with a value that equals the difference between the angle between the longitudinal axes (32, 281) of the profiles (20, 81) being connected and an angle ($\delta$) of the bevel surface of the second profile (20), and the fourth profile (82) of the second set (80) of profiles at the point of its connection with the fifth profile (84) has a bevel having a bevel surface disposed at right angle to the plane where longitudinal axes (282, 284) of the fifth profile (84) being connected are situated and placed at an angle ($\theta$) complementing an angle between the longitudinal axes of the fourth profile (82) and the fifth profile (84) being connected located at an angle in relation to each other with a value that equals the difference between an angle between the longitudinal axes of the fourth profile (82) and the fifth profile (84) being connected and an angle ($\zeta$) of the bevel surface of the fourth profile (82) measured in a plane where the longitudinal axes (282, 284) of the fourth profile (82) and the fifth profile (84) being connected are situated.

11. The structure according to claim 10 wherein a connection of the third profile (81) and the second profile (20) is reinforced by the third corner joint whose longitudinal axes of arms embedded in an auxiliary chamber of the third profile (81) and in an auxiliary chamber of the second profile (20) are placed at an angle that equals an angle between longitudinal axes of an auxiliary chamber of the third profile (81) and the auxiliary chamber of the second profile (20) and a connection of the fourth profile (82) and the fifth profile (84) is reinforced by the fourth corner joint whose longitudinal axes of arms embedded in an auxiliary chamber of the fourth profile (82) and in an auxiliary chamber of the fifth profile (84) are placed at an angle that equals an angle between longitudinal axes of the auxiliary chamber of the fourth profile (82) and the auxiliary chamber of the fifth profile (84).

12. A method for creating structures from connected together profiles having walls surrounding a main chamber, where one of the walls is a main wall having a frame made from profiles or sets of profiles whereas one of the profiles is a second profile (20) and one of the sets of profiles is a second set (80) comprising a third profile (81) and a fourth profile (82) where one is a mirror image of the other and third profile (81) and a fourth profile (82) are connected together and are adjoining with faying faces of third profile (81) and a fourth profile (82) whereas outer surfaces of side walls of the third profile (81) and the fourth profile (82) are situated outside and an angle between outer surfaces of side wall of the third profile (81) and the fourth profile (82) equals the sum of an angle between the faying face and the outer surface of the side wall of the third profile (81) and an angle between the faying face and the outer surface of the side wall of the fourth profile (82), the method comprising by connecting the third profile (81) and the second profile (20), inserting a first arm of a third corner joint into an auxiliary chamber of the third profile (81) and a second arm of the third corner joint into an auxiliary chamber of the second profile (20) wherein the third profile (81) of the second set of profile (80) at a point of a connection of the third profile (81) with the second profile (20) has a bevel with a bevel surface disposed at a right angle to a plane where a longitudinal axis (32) of the second profile (20) and a longitudinal axis (281) of the third profile (81) being connected are situated, and placed at an angle ($\epsilon$) complementing an angle between the longitudinal axis (32) and the longitudinal axis (281) of the profiles (20, 81) being connected located at an angle to each other with a value that equals the difference between the angle between the longitudinal axes (32, 281) of the profiles (20, 81) being connected and an angle ($\delta$) of the bevel surface of the second profile (20); and repeating a step of inserting next corner joints or corner pieces (86) when residual profiles of a structure made from profiles are connected together at ends of the residual profiles.

* * * * *